UNITED STATES PATENT OFFICE.

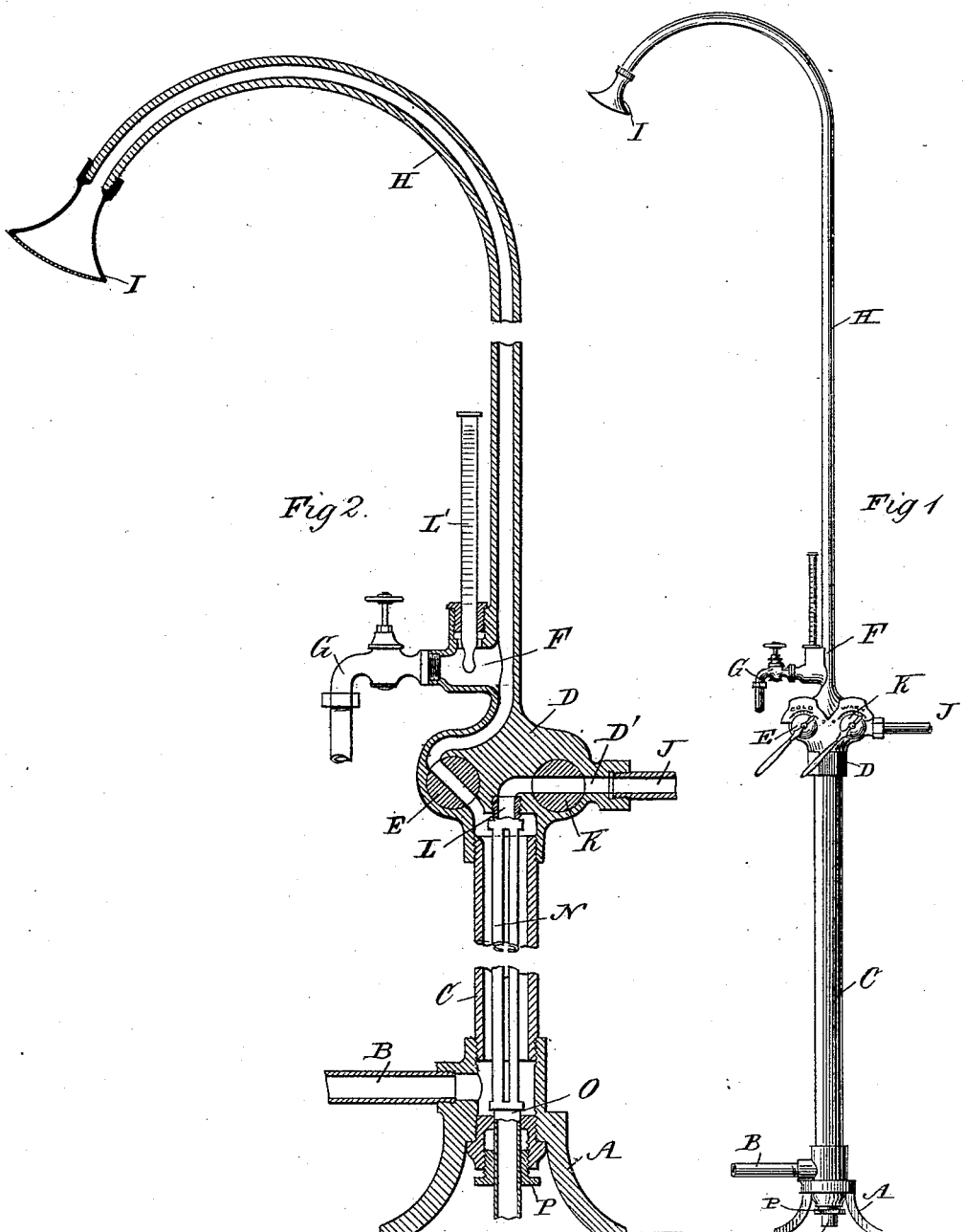

HEINRICH SCHAFFSTÄDT, OF GIESSEN, GERMANY.

SHOWER-BATH, &c.

SPECIFICATION forming part of Letters Patent No. 425,702, dated April 15, 1890.

Application filed August 5, 1889. Serial No. 319,729. (No model.)

*To all whom it may concern:*

Be it known that I, HEINRICH SCHAFFSTÄDT, a subject of the Emperor of Germany, residing at Giessen, in the Empire of Germany, have invented new and useful Improvements in Shower and other Baths, of which the following is a specification.

The object of the invention is to provide certain new and useful improvements in shower and other baths, whereby the water is heated to any desired temperature by steam traveling through pipes in an opposite direction to that in which the water is flowing without coming in contact with the water.

The invention consists of a water-pipe provided with the usual spray-nozzle and outlet-faucet, and of a steam-pipe extending through the said water-pipe and heating the water, said steam passing in an opposite direction to that from which the water flows through the water-pipe.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in both the figures.

Figure 1 is a side elevation of the improvement, and Fig. 2 is an enlarged sectional side elevation of the same.

The improvement is provided with a suitably-constructed base A, into which leads a water-supply pipe B, connected with a suitable source of water-supply. From the base A extends the water-pipe C, supporting at its upper end an offset D, containing a valve E, of any approved construction, and serving to establish communication between the water-pipe C and the pipe F, carrying the usual outlet-faucet G, and continuing into the spray-pipe H, extending upward and bent over to support at its upper end the spray-nozzle I, of any approved construction.

Into the offset D leads a steam-pipe J, connected with a suitable source of steam-supply. The pipe J discharges into a passage D' in the offset D, and in the said passage is held a valve K for regulating the amount of steam passing from the pipe J through the passage D' into a short pipe L, connected by one or more thin small pipes N with a pipe O, passing through a stuffing-box P, held in the bottom of the base A. The small thin pipes N pass centrally through the water-pipe C, and the pipe O, connected with the said small pipes, is free to expand or contract according to the temperature of the said pipes, on account of passing through the stuffing-box P.

The valves E and K are operated by suitable handles from the outside, and suitable inscriptions are placed over the said valves, as shown in Fig. 1, to indicate the respective positions of the said valves. The water passing through the pipe B passes into the hollow base A, and from the latter upward through the water-pipe C. When the operator now opens the valve K, steam passes from the pipe J through the passage D' into the pipe L, and from the latter through the thin pipes N downward in an opposite direction to that in which the water flows, so that the latter is heated to any desired temperature. The steam from the pipes N finally passes, either in a vaporous condition or as condensed water, into the pipe O, and from the latter to the outside and into the tank supplying water to the pipe B. The heated water from the pipe C then passes through the open valve E into the pipe F, and from the latter through the spray-pipe H into and through the nozzle I in the usual manner. The heated water may also be used to fill the bath-tub by opening the faucet G. A thermometer L' is held on the pipe F to indicate the temperature of the heated water. It will be seen that by this device the steam does not come in direct contact with the water to be heated, and hence it is impossible to scald the person taking a shower-bath, as is frequently the case in apparatus in which the steam is mixed directly with the water. It will be understood that the heated water remains pure, as the water of condensation is not mixed with the water for the bath or shower-bath. By opening the valve K a greater or less quantity of steam is admitted through the pipes N, and consequently the water can be heated to any desired temperature.

Having thus fully described my invention, I claim as new and desire to secure by Letters Patent—

1. In a shower or other bath, the combination, with a water-pipe provided with the usual spray-nozzle and outlet-faucet, of a steam-pipe extending through the said water-pipe and leading the steam in a direction opposite to the flow of the water, substantially as shown and described.

2. In a shower or other bath, the combination, with a water-pipe connected with a suitable source of water-supply at its bottom, of one or more steam-pipes passing through the said water-pipe and a steam-inlet pipe leading into the upper ends of the said steam-pipes, so that the steam passing through the series of pipes passes in a direction opposite to the flow of the water in the water-pipe, substantially as shown and described.

3. In a shower or other bath, the combination, with a water-pipe connected with a suitable source of water-supply at its bottom, of one or more steam-pipes passing through the said water-pipe and a steam-inlet pipe leading into the upper end of the said steam-pipes, so that the steam passing through the series of pipes passes in a direction opposite to the flow of the water in the water-pipe, and a valve for regulating the supply of steam, substantially as shown and described.

4. In a shower or other bath, the combination, with a base, of a water-pipe supported on the said base and connected at the latter with a suitable source of water-supply, so that the water travels upward in the said water-pipe, an offset held on the upper end of the said water-pipe and connecting by a valve with the spray-pipe, a series of steam-pipes passing through the said water-pipe, a steam-inlet pipe connected with the said series of pipes, and a valve held in the said offset and serving to regulate the supply of steam, substantially as shown and described.

5. In a shower or other bath, the combination, with a base, of a water-pipe supported on the said base and connected at the latter with a suitable source of water-supply, so that the water travels upward in the said water-pipe, an offset held on the upper end of the said water-pipe and connecting by a valve with the spray-pipe, a series of steam-pipes passing through the said water-pipe, a steam-inlet pipe connected with the said series of pipes, a valve held in the said offset and serving to regulate the supply of steam, a steam-outlet pipe into which discharges said series of pipes, and a stuffing-box surrounding the said steam-outlet pipe and held in the bottom of the said base, substantially as shown and described.

In testimony whereof I have signed my name to this specification in the presence of two subscribing witnesses.

HEINRICH SCHAFFSTÄDT.

Witnesses:
JOSEPH PATRICK,
JEAN GRUND.